United States Patent
Sakaguchi

(10) Patent No.: US 11,036,487 B2
(45) Date of Patent: Jun. 15, 2021

(54) VEHICLE

(71) Applicant: SUBARU CORPORATION, Tokyo (JP)

(72) Inventor: Shinichi Sakaguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/412,725

(22) Filed: May 15, 2019

(65) Prior Publication Data

US 2020/0004525 A1  Jan. 2, 2020

(30) Foreign Application Priority Data

Jun. 29, 2018 (JP) .............................. JP2018-124418

(51) Int. Cl.
| | |
|---|---|
| *G06F 8/65* | (2018.01) |
| *G06F 8/71* | (2018.01) |
| *H04L 29/08* | (2006.01) |
| *B60R 16/023* | (2006.01) |

(52) U.S. Cl.
CPC .............. *G06F 8/65* (2013.01); *B60R 16/023* (2013.01); *G06F 8/71* (2013.01); *H04L 67/34* (2013.01)

(58) Field of Classification Search
CPC ... G06F 8/65; G06F 8/71; H04L 67/34; B06R 16/023
See application file for complete search history.

(56) References Cited

U.S. PATENT DOCUMENTS

| | | | | |
|---|---|---|---|---|
| 6,687,901 | B1* | 2/2004 | Imamatsu | ................. G06F 8/65 |
| | | | | 455/418 |
| 10,061,576 | B2* | 8/2018 | Kurosawa | ............... G06F 11/00 |
| 10,496,393 | B2* | 12/2019 | Okuyama | ................. G06F 8/65 |

(Continued)

FOREIGN PATENT DOCUMENTS

| | | |
|---|---|---|
| JP | 2006-293816 A | 10/2006 |
| JP | 2008-024015 A | 2/2008 |

(Continued)

OTHER PUBLICATIONS

Japanese Office Action, dated Feb. 4, 2020, in Japanese Application No. 2018-124418 and English Translation thereof.

*Primary Examiner* — Douglas M Slachta
(74) *Attorney, Agent, or Firm* — McGinn IP Law Group, PLLC

(57) ABSTRACT

A vehicle includes a control unit and an onboard communication device. The control unit includes a memory and is configured to store a program and a first version identifier in the memory. The program is updated at any program update timing. The first version identifier is directed to identifying of a version of the updated program. The onboard communication device is configured to hold information relating to memory addresses of the memory and hold a second version identifier that is updated at predetermined timing independent of the program update timing. The onboard communication device is configured to obtain, at the predetermined timing, the first version identifier in the memory from the control unit and to update the information relating to the memory addresses by communicating with the management server when the first version identifier in the memory does not agree with the second version identifier in the onboard communication device.

20 Claims, 2 Drawing Sheets

(56) References Cited

U.S. PATENT DOCUMENTS

| | | | |
|---|---|---|---|
| 10,599,418 B2* | 3/2020 | Kiyama | G06F 11/1433 |
| 10,642,679 B2* | 5/2020 | Fox | B60W 50/0225 |
| 10,705,822 B2* | 7/2020 | Yamashita | H04W 4/80 |
| 2002/0188934 A1* | 12/2002 | Griffioen | G06F 8/65 |
| | | | 717/170 |
| 2004/0034861 A1* | 2/2004 | Ballai | G06F 8/65 |
| | | | 719/321 |
| 2006/0259207 A1* | 11/2006 | Natsume | G06F 8/65 |
| | | | 701/1 |
| 2007/0169080 A1* | 7/2007 | Friedman | G06F 8/65 |
| | | | 717/168 |
| 2008/0021607 A1 | 1/2008 | Kato et al. | |
| 2011/0105029 A1* | 5/2011 | Takayashiki | H04W 8/245 |
| | | | 455/41.2 |
| 2011/0119664 A1* | 5/2011 | Kimura | G06F 8/60 |
| | | | 717/173 |
| 2012/0216183 A1* | 8/2012 | Mahajan | G06F 8/65 |
| | | | 717/170 |
| 2013/0086574 A1* | 4/2013 | Yada | G06F 8/65 |
| | | | 717/173 |
| 2014/0380296 A1* | 12/2014 | Pal | G06F 8/65 |
| | | | 717/171 |
| 2015/0199194 A1* | 7/2015 | Niwa | G06F 8/658 |
| | | | 717/170 |
| 2016/0291959 A1* | 10/2016 | Searle | H04L 63/10 |
| 2016/0364232 A1* | 12/2016 | Moeller | H04L 67/34 |
| 2016/0371075 A1* | 12/2016 | Moeller | G06F 8/654 |
| 2017/0249137 A1* | 8/2017 | Ang | G06F 8/65 |
| 2018/0018160 A1* | 1/2018 | Teraoka | G06F 11/00 |
| 2018/0018164 A1* | 1/2018 | Kurosawa | B60R 16/02 |
| 2018/0048473 A1* | 2/2018 | Miller | H04L 9/3247 |
| 2018/0152341 A1* | 5/2018 | Maeda | G06F 11/00 |
| 2019/0018964 A1* | 1/2019 | Basehore | G06F 8/65 |
| 2019/0155594 A1* | 5/2019 | Nakaguma | G06F 13/00 |
| 2019/0265966 A1* | 8/2019 | Shimomura | G06F 11/00 |
| 2019/0278583 A1* | 9/2019 | Nie | G06F 13/102 |
| 2019/0286454 A1* | 9/2019 | Sano | G06F 9/44505 |

FOREIGN PATENT DOCUMENTS

| | | |
|---|---|---|
| JP | 2010-113409 A | 5/2010 |
| JP | 2011-090457 A | 5/2011 |
| JP | 2017-004212 A | 1/2017 |
| WO | WO 2017/046981 A1 | 3/2017 |

* cited by examiner

VEHICLE

CROSS-REFERENCE TO RELATED APPLICATIONS

The present application claims priority from Japanese Patent Application No. 2018-124418 filed on Jun. 29, 2018, the entire contents of which are hereby incorporated by reference.

BACKGROUND

The technology relates to a vehicle included in a data communication system. Japanese Unexamined Patent Application Publication No. 2006-293816 discloses a technique of updating a contract management table that is stored in a hard disk of an onboard terminal device, in accordance with contents stored in a server provided outside a vehicle. The contract management table describes a state of a contract with each content provider.

SUMMARY

An aspect of the technology provides a vehicle including a control unit and an onboard communication device. The control unit is configured to store a program in a memory and execute the stored program to control each device of the vehicle. The onboard communication device is configured to hold a memory address in a manner associated with the control unit and to designate the memory address to thereby transmit data from the memory of the control unit to a management server provided outside the vehicle. The memory of the control unit is configured to hold, together with the program, a version identifier directed to identifying of a version of the program. The onboard communication device is configured to hold, together with the memory address, a version identifier associated with the control unit. The version identifier is updated at predetermined timing. The onboard communication device is configured to obtain, when the version identifier stored in the memory does not agree with the version identifier associated with the control unit, a memory address corresponding to the version identifier stored in the memory from the management server, associate the obtained memory address and the version identifier stored in the memory with the control unit, and thereafter designate the associated memory address to transmit data from the memory of the control unit to the management server.

An aspect of the technology provides a vehicle including a control unit and an onboard communication device. The control unit includes a memory and is configured to store a program and a first version identifier in the memory. The program is updated at any program update timing. The first version identifier is directed to identifying of a version of the updated program. The onboard communication device is configured to hold information relating to memory addresses of the memory and hold a second version identifier that is updated at predetermined timing independent of the program update timing. The onboard communication device is configured to be communicable with the control unit and with a management server provided outside the vehicle. The onboard communication device is configured to obtain, at the predetermined timing, the first version identifier stored in the memory from the control unit and to update the information relating to the memory addresses by communicating with the management server when the first version identifier stored in the memory does not agree with the second version identifier held by the onboard communication device.

An aspect of the technology provides a vehicle including a control unit and circuitry. The control unit includes a memory and is configured to store a program and a first version identifier in the memory. The program is updated at any program update timing. The first version identifier is directed to identifying of a version of the updated program. The circuitry is configured to hold information relating to memory addresses of the memory and hold a second version identifier that is updated at predetermined timing independent of the program update timing. The circuitry is configured to be communicable with the control unit and with a management server provided outside the vehicle. The circuitry is configured to obtain, at the predetermined timing, the first version identifier stored in the memory from the control unit and update the information relating to the memory addresses by communicating with the management server when the first version identifier stored in the memory does not agree with the second version identifier held by the circuitry.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
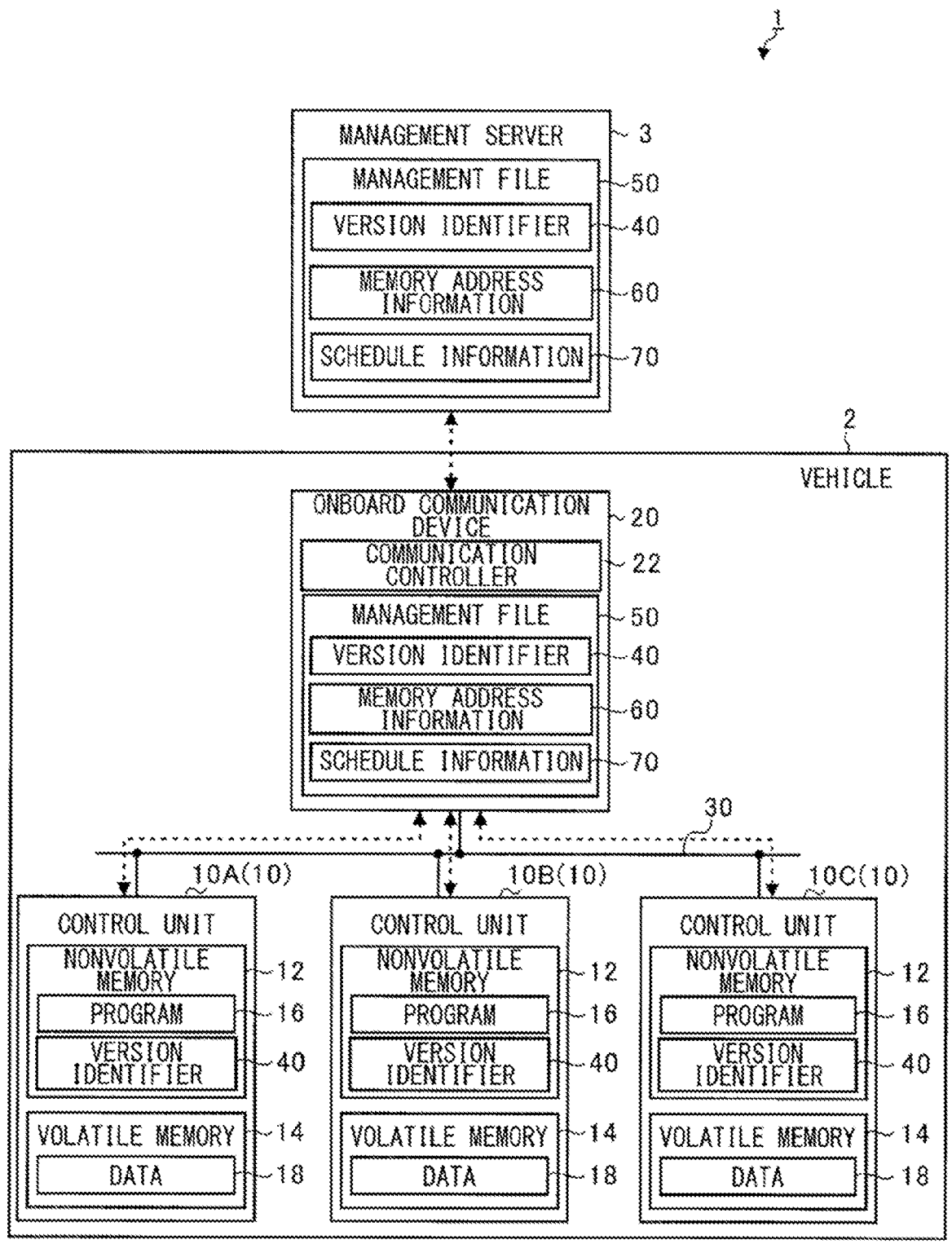
FIG. 1 is a block diagram illustrating an example of a configuration of a data communication system according to one embodiment of the technology.

In the following, a description is given of one example embodiment of the technology with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a dimension of each of the elements, a size of each of the elements, a ratio between the elements, relative positional relationship between the elements, a material of each of the elements, and any other specific numerical value are illustrative only and not to be construed as limiting to the technology unless being specified. Further, elements in the following example embodiments which are not recited in a most-generic independent claim of the disclosure are optional and may be provided on an as-needed basis. Throughout the present specification and the drawings, elements substantially the same as or equivalent to each other are denoted with the same numerals to avoid any redundant description. Elements not directly related to one embodiment of the technology may not be illustrated.

A vehicle may be provided with one or a plurality of control units directed to controlling of each device of the vehicle. The one or each of the plurality of control units may include a memory. In the memory, a program directed to a control and various kinds of data may be stored. The various kinds of data may include, for example but not limited to, a result of operation of each device of the vehicle. For example, in order to check whether each device of the vehicle operates properly, data in the memory of the control unit may be transmitted to a management server provided outside the vehicle via an onboard communication device in some cases. In one example, the onboard communication device may designate a memory address of the memory to read data, and may transmit the data to the management server.

In some cases, the programs of the control units may be improved individually after vehicles are distributed in the market. In such cases, the program of the control unit may be updated at a place such as a service station. In updating the program, a compiled program of the latest version may be stored in the memory of the control unit.

Such an update may change a relationship between the memory address of the memory and various kinds of data due to an influence of a compiler, which compiles the program, before and after the update in some cases. The update may be performed on the individual control units. Therefore, the change of the memory address may not be recognized by the onboard communication device in some cases.

In this situation, after the update is performed, the onboard communication device can possibly designate the memory address before the change has been made and read data different from data that should be read. This can cause transmission of mistakenly-selected data from the control unit provided in the vehicle to the management server provided outside the vehicle.

It is desirable to provide a vehicle that enables avoiding transmitting mistakenly-selected data when data is transmitted from a control unit provided in the vehicle to a management server provided outside the vehicle.

FIG. 1 is a block diagram illustrating a configuration of a data communication system 1 according to one example embodiment of the technology. FIG. 1 illustrates a flow of signals by dashed-line arrows. The following describes details of configurations, processes, etc. relating to one example embodiment of the technology, and configurations, processes, etc. irrelevant to one example embodiment of the technology may not be described.

The data communication system 1 may include a vehicle 2 and a management server 3 that is provided outside the vehicle 2. The vehicle 2 may be, for example but not limited to, a hybrid electric automobile. The vehicle 2 may include a plurality of control units, e.g., a control unit 10A, a control unit 10B, and a control unit 10C, an onboard communication device 20, and a bus 30. In the following, the control unit 10A, 10B, or 10C may be represented as a "control unit 10" in the case where it is not necessary to distinguish the control units 10A, 10B, and 10C from each other. The data communication system 1 may be configured to allow the control unit 10 provided in the vehicle 2 to transmit data to the management server 3 provided outside the vehicle 2.

In one embodiment, the control units 10A, 10B, and 10C may serve as respective "control units". In one embodiment, the onboard communication device 20 may serve as an "onboard communication device".

The control unit 10A may be, for example, a comprehensive control unit that comprehensively controls the whole vehicle 2. The control unit 10B may be, for example, an engine control unit that controls an engine. The control unit 10C may be, for example, a motor control unit that controls a motor. Each of the control units 10A, 10B, and 10C is not limited to the comprehensive control unit, the engine control unit, and the motor control unit and may be any other control unit such as a torque control unit or a battery control unit.

The control unit 10 may include a semiconductor integrated circuit that includes components including, for example, a central processing unit (CPU), a nonvolatile memory 12, and a volatile memory 14. The nonvolatile memory 12 may be, for example, a read-only memory (ROM) in which a program 16 and any other information are stored. The volatile memory 14 may be, for example, a random-access memory (RAM) that operates as a work region. The control unit 10 may duplicate or copy the program 16 stored in the nonvolatile memory 12 to the volatile memory 14 at the time of activation, for example. The CPU of the control unit 10 may control each device of the vehicle 2 by reading and executing the program 16 duplicated in the volatile memory 14.

In one embodiment, the nonvolatile memory 12 and the volatile memory 14 may serve as respective "memories".

The vehicle 2 may be configured to allow the program 16 in the nonvolatile memory 12 of each of the control units 10 to be updated. For example, in a case where a program 16 of the latest version is created, the created program 16 of the latest version may be compiled by a compiler provided outside the vehicle. The compiled program 16 of the latest version may, for example, be stored in the management server 3 and a computer at a service station or a dealer.

The vehicle 2 may be provided with, for example, an input and output connector that is coupled to the bus 30. The input and output connector is not illustrated in the drawings. The vehicle 2 having the program 16 to be updated may be brought to the service station. After the vehicle 2 is brought to the service station, the input and output connector may be coupled to a computer at the service station. The computer at the service station may transmit the compiled program 16 of the latest version to the control unit 10 of the vehicle 2 via the input and output connector. The control unit 10 may update the program 16 in the nonvolatile memory 12 to the received compiled program 16 of the latest version.

In the volatile memory 14 of the control unit 10, various kinds of data 18 may be stored in addition to the program 16. The various kinds of data 18 may include, for example, a result of operation of each device of the vehicle 2. Examples of the data 18 may include the number of rotation of an engine, variation in torque of the engine, the number of rotation of a motor, and variation in torque of the motor.

The control unit 10 may also duplicate the various kinds of data 18 in the volatile memory 14 to the nonvolatile memory 12 at the time of shutdown of the control unit 10 or any other suitable timing, for example. Moreover, the control unit 10 may also duplicate the various kinds of data 18 that have been duplicated in the nonvolatile memory 12, to the volatile memory 14, at the time of activation of the control unit 10 or any other suitable timing, for example.

The vehicle 2 may be configured to allow transmission of a desired piece of data 18 to the management server 3, among the various kinds of data 18 stored in the volatile memory 14 of the control unit 10. The desired piece of data 18 may be, for example, data relating to a check of operation of the vehicle 2. The desired piece of data 18 in the control unit 10 may be transmitted to the management server 3, for example, to enable to check outside the vehicle 2 whether each device of the vehicle 2 operates properly. The following may describe the desired piece of data 18 to be transmitted to the management server 3, as "transmission target data 18".

The onboard communication device 20 may be provided in the vehicle 2. The onboard communication device 20 may include a semiconductor integrated circuit that includes components including a CPU, a nonvolatile memory, and a volatile memory. The onboard communication device 20 may be, for example, a data communication module (DCM). The onboard communication device 20 may execute a program stored in the nonvolatile memory, and thus, the onboard communication device 20 may serve as a communication controller 22. The communication controller 22 may allow for a communication between the onboard communication device 20 and the control unit 10 and a communication between the onboard communication device 20 and the management server 3.

The onboard communication device 20 and each of the control units 10 may be coupled via the bus 30. The onboard communication device 20, each of the control units 10, and the bus 30 may provide a controller area network (CAN). That is, the onboard communication device 20 may make a wired communication with each of the control units 10 via the bus 30.

The onboard communication device 20 may include an unillustrated antenna. The onboard communication device 20 may be coupled to a wireless communication network such as a mobile phone network. The management server 3 may include an unillustrated antenna. The management server 3 may be coupled to a wireless communication network such as a mobile phone network. That is, the onboard communication device 20 may be coupled to the management server 3 via a wireless communication network and wirelessly communicates with the management server 3.

The management server 3 may receive the transmission target data 18 that is transmitted from the vehicle 2. The management server 3 may hold the program 16 of the latest version for each of the control units 10. The management server 3 may also hold programs 16 of the past versions in predetermined preceding generations before the latest generation, in addition to the program 16 of the latest version.

The onboard communication device 20 may designate the memory address of the volatile memory 14 of the control unit 10 at timing of transmitting the transmission target data 18. The CPU of the control unit 10 may read the data 18, that is, the transmission target data 18, stored in the designated memory address. The CPU of the control unit 10 may transmit the read data 18 to the onboard communication device 20, and the onboard communication device 20 may transmit the received data 18 to the management server 3.

In the condition in which the program 16 in the nonvolatile memory 12 of the control unit 10 is updated to the compiled program 16 of the latest version, the relationship between the memory address of the volatile memory 14 and the transmission target data 18 may be changed before and after the update of the program 16 in some cases, due to an influence of the compiler that has created the compiled program 16 of the latest version. However, the update of the program 16 may be performed on each of the control units 10. Therefore, the relationship between the memory address held by the onboard communication device 20 and the transmission target data 18 may not be updated accordingly in some cases.

Even in the case where the relationship between the memory address and the transmission target data 18 is changed in the control unit 10, the onboard communication device 20 may designate the memory address before the change is made, unless the relationship between the memory address and the transmission target data 18 is not changed in the onboard communication device 20. This may cause the CPU of the control unit 10 to read data 18 that is different from data 18 that should be read. As a result, the CPU of the control unit 10 can possibly transmit mistakenly-selected data 18 to the management server 3 via the onboard communication device 20.

In view of this, the vehicle 2 of one example embodiment of the technology may control communication using an identifier directed to identifying of the version of the program 16 at the time of transmitting the transmission target data 18 from the control unit 10 to the management server 3, thereby avoiding transmission of mistakenly-selected data 18 to the management server 3. The identifier described above may be referred to as a version identifier 40.

In the nonvolatile memory 12 of the control unit 10, the version identifier 40 may be stored. The version identifier 40 may be provided for each of the nonvolatile memories 12. The version identifier 40 may uniquely identify the version of the program 16 of the control unit 10. The version identifier 40 may be, for example, a code of numbers, characters, or any other symbol enumerated by a predetermined number of digits. For example, the number of digits may be 10.

For example, the version identifier 40 in the control unit 10 may indicate the version of the program 16 currently stored in the nonvolatile memory 12. The version identifier 40 in the control unit 10 may be updated to a version identifier 40 that indicates the version of the updated program 16, in accordance with the update of the program 16 in the nonvolatile memory 12.

The version identifier 40 that is stored in the nonvolatile memory 12 may be stored in the volatile memory 14 together with the program 16 upon the activation of the control unit 10, for example. At this time, the version identifier 40 may be stored in a fixed memory address in the volatile memory 14 other than the memory address in which the data 18 is to be stored. The memory address in which the data 18 is to be stored may address a data storing region. Therefore, even in the case where the relationship between the memory address and the data 18 is changed before and after the program 16 is updated, the relationship between the memory address and the version identifier 40 is not changed before and after the program 16 is updated. That is, the CPU of the control unit 10 reliably reads the version identifier 40 even though the program 16 is updated.

In the management server 3, a management file 50 may be stored. The management file 50 may be a database file that defines various kinds of setting values to be used for the communication between the onboard communication device 20 and the control unit 10 and for the communication between the onboard communication device 20 and the management server 3.

The management file 50 may include at least the version identifier 40, memory address information 60, and schedule information 70. The information included in the management file 50 is not limited to the version identifier 40, the memory address information 60, and the schedule information 70. For example, the management file 50 may also include a setting value that is necessary for the communication between the onboard communication device 20 and the control unit 10.

In one embodiment, the memory address information 60 may serve as "information relating to a memory address".

The version identifier 40 that is included in the management file 50 of the management server 3 may indicate the latest version of the program 16 of the control unit 10. The management file 50 may include the version identifiers 40 by the number of the nonvolatile memories 12 of the control units 10. The version identifier 40 that is included in the management file 50 of the management server 3 may, at the time when the compiled program 16 of the latest version is stored in the management server 3, be updated to a version identifier 40 indicating the latest version of the program 16 to be stored.

The memory address information 60 may include a list of memory addresses in the volatile memory 14 of all of the every control units 10 that are associated with types of transmission target data 18. For example, the memory address in the volatile memory 14 may address a data region. The memory address may be, for example, a physical address or a logical address.

The memory address information 60 that is included in the management file 50 of the management server 3 may be the latest one. The memory address information 60 that is included in the management file 50 of the management server 3 may be updated to the latest one in accordance with the program 16 of the latest version at the time when the compiled program 16 of the latest version is stored in the management server 3.

The schedule information 70 may define a schedule of operation of the onboard communication device 20. The schedule information 70 may define, for example, start timing of a series of processes directed to transmitting of the transmission target data 18 from the control unit 10 to the management server 3.

The schedule information 70 that is included in the management file 50 of the management server 3 may be the latest one. The schedule information 70 that is included in the management file 50 of the management server 3 may be updated to the latest one at the time when the compiled program 16 of the latest version is stored in the management server 3.

Thus, the version identifier 40, the memory address information 60, and the schedule information 70, which are included in the management file 50 of the management server 3, that is, the management file 50 of the management server 3, may be maintained to contain the latest contents at any time.

The management file 50 may be stored also in the onboard communication device 20. The management file 50 of the onboard communication device 20 may include the version identifier 40, the memory address information 60, and the schedule information 70. The management file 50 of the onboard communication device 20 may be obtained from the management server 3 to be updated in a case where a predetermined condition is satisfied. The predetermined condition will be described later. That is, the updates of the version identifier 40, the memory address information 60, and the schedule information 70 in the onboard communication device 20, that is, the update of the management file 50, may be independent of and not be synchronized with the update of the program 16 of the control unit 10. Therefore, the version identifier 40, the memory address information 60, and the schedule information 70 in the onboard communication device 20 may not be the latest ones in some cases.

The communication controller 22 of the onboard communication device 20 may obtain the version identifier 40 stored in the nonvolatile memory 12 of the control unit 10 in accordance with the schedule information 70 in the management file 50 of the onboard communication device 20. The communication controller 22 may compare the obtained version identifier 40 of the control unit 10 with the version identifier 40 stored in the onboard communication device 20. In the case where the obtained version identifier 40 of the control unit 10 agrees with the version identifier 40 of the onboard communication device 20, the communication controller 22 may designate the memory address of the volatile memory 14 of the control unit 10 to obtain the transmission target data 18 and may thereafter transmit the obtained transmission target data 18 to the management server 3.

In contrast, in the case where the obtained version identifier 40 of the control unit 10 does not agree with the version identifier 40 of the onboard communication device 20, the communication controller 22 may obtain the latest management file 50 from the management server 3 and update the management file 50 of the onboard communication device 20. Thereafter, the communication controller 22 may designate the memory address of the volatile memory 14 of the control unit 10 to obtain the transmission target data 18 and may thereafter transmit the obtained transmission target data 18 to the management server 3.

Figure 2:
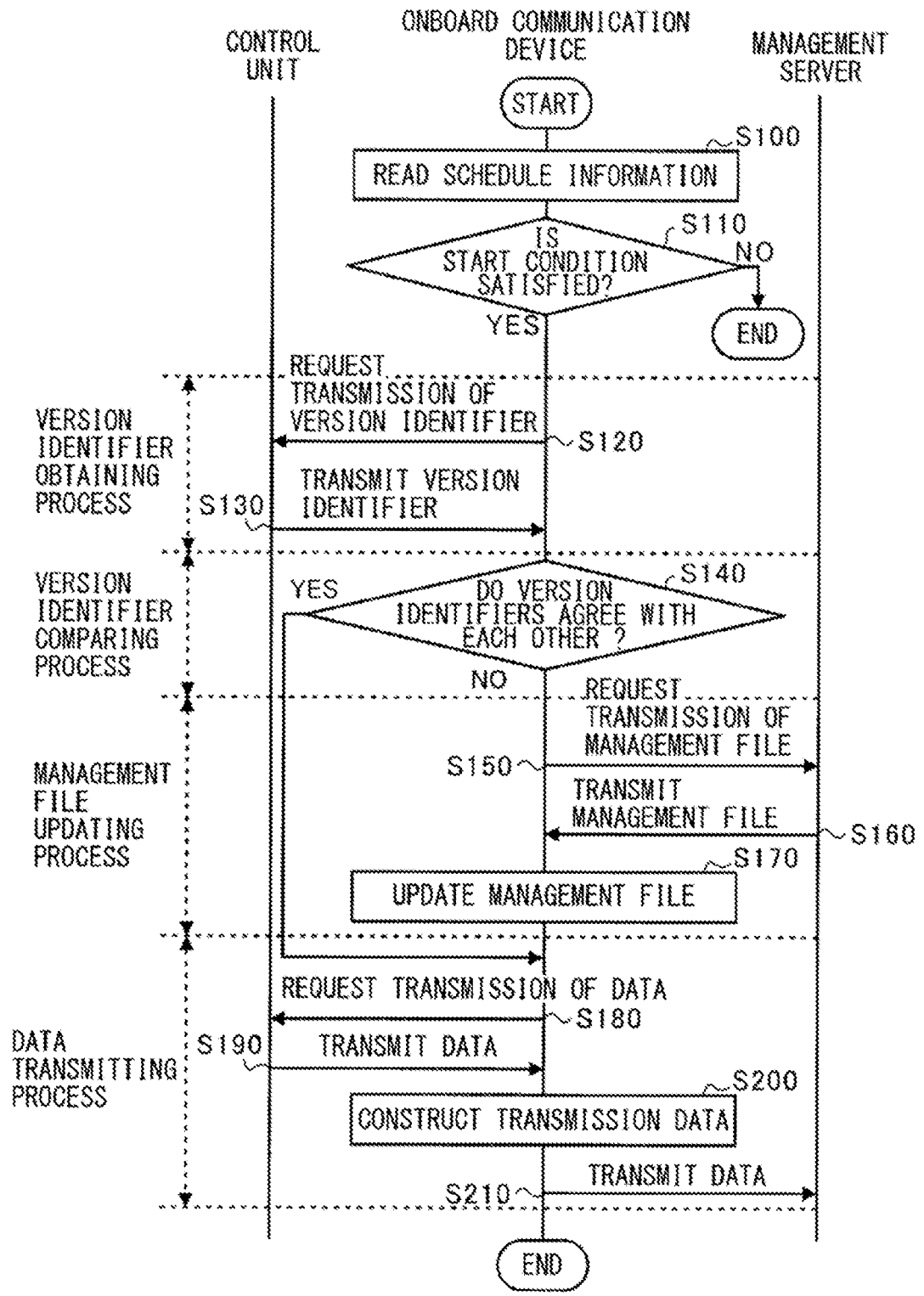
FIG. 2 is an explanatory diagram for explaining an example of operation of the data communication system.

FIG. 2 is an explanatory diagram for explaining operation of the data communication system 1. After the onboard communication device 20 is activated in response to turning on of an ignition switch of the vehicle 2, the communication controller 22 of the onboard communication device 20 may first read the schedule information 70 in the management file 50 (S100).

Thereafter, the communication controller 22 may determine whether a predetermined start condition that is indicated by the read schedule information 70 is satisfied (S110). The predetermined start condition may be, for example, that seven days have passed after the data 18 is transmitted last time. The predetermined start condition is not limited to the condition that seven days have passed after the data 18 is transmitted last time. For example, the predetermined start condition may be that fourteen days have passed after the data 18 is transmitted last time. Alternatively, the predetermined start condition may be that one month has passed after the data 18 is transmitted last time.

In the case where the predetermined start condition is not satisfied ("NO" in S110), the communication controller 22 may bring the process to an end. Otherwise, in the case where the predetermined start condition is satisfied ("YES" in S110), the communication controller 22 may make the process advance to step S120 and may start a series of processes relating to transmission of the transmission target data 18.

First, the communication controller 22 may transmit a version identifier transmission request to the control unit 10 in which the transmission target data 18 is stored (S120). The version identifier transmission request may be directed to requesting of transmission of the version identifier 40. The control unit 10 that is to receive the version identifier transmission request may be defined by the schedule information 70 or any other information, for example.

Upon receiving the version identifier transmission request, the CPU of the control unit 10 may read the version identifier 40 stored in the volatile memory 14 and may transmit the read version identifier 40 to the onboard communication device 20 (S130). Thus, the onboard communication device 20 may obtain the version identifier 40 of the control unit 10. As described above, the memory address at which the version identifier 40 is stored may be fixed regardless of the update of the program 16. This enables the onboard communication device 20 to reliably obtain the version identifier 40.

Steps S120 and S130 may be a version identifier obtaining process directed to obtaining of the version identifier 40 from the control unit 10 by the onboard communication device 20.

The version identifier obtaining process may involve, in the case where there is a plurality of pieces of the transmission target data 18 in the plurality of volatile memories 14, transmitting of the version identifier transmission request from the communication controller 22 to each of the plurality of control units 10 containing the transmission target data 18 (S120). The CPU of each of the control units 10, upon receiving the version identifier transmission request, may transmit the own version identifier 40 to the onboard communication device 20 (S130).

After the version identifier 40 is obtained, the communication controller 22 may determine whether the obtained version identifier 40 of the control unit 10 agrees with the version identifier 40 stored in the onboard communication device 20 or the version identifier 40 in the management file 50 (S140). Step S140 may be a version identifier comparing process directed to comparing of the obtained version identifier 40 of the control unit 10 with the version identifier 40 stored in the onboard communication device 20.

In a case where a plurality of pieces of transmission target data 18 is included in the plurality of volatile memories 14, the communication controller 22 may perform comparing with respect to each of the obtained version identifiers 40. For example, in a case where the version identifier 40 of the control unit 10A and the version identifier 40 of the control unit 10B are obtained, the communication controller 22 may compare the version identifier 40 of the control unit 10A with the version identifier 40 for the control unit 10A stored in the onboard communication device 20. The communication controller 22 may also compare the version identifier 40 of the control unit 10B with the version identifier 40 for the control unit 10B stored in the onboard communication device 20.

In the case where the obtained version identifier 40 of each of the control unit 10 agrees with the version identifier 40 stored in the onboard communication device 20 ("YES" in S140), the communication controller 22 may cause the process to advance to the process in step S180, which is a data transmitting process, without updating the management file 50. The process in step S180 will be described later. One reason why the management file 50 is not updated is that the management file 50 of the onboard communication device 20 is already renewed to the latest one in the case where the obtained version identifier 40 of the control unit 10 agrees with the version identifier 40 stored in the onboard communication device 20. That is, in this case, the relationship between the memory address of the volatile memory 14 and the transmission target data 18 and the relationship between the memory address of the memory address information 60 of the onboard communication device 20 and the transmission target data 18 already agree with each other.

The process in step S140 in the case where the onboard communication device 20 obtains the plurality of version identifier 40 may be as follows. In the case where each of the plurality of obtained version identifiers 40 agrees with the version identifier 40 of the onboard communication device 20, the communication controller 22 may determine that the obtained version identifiers 40 of the control units 10 agree with the version identifiers 40 stored in the onboard communication device 20.

In contrast, in the case where each of the obtained version identifiers 40 of the control units 10 does not agree with the version identifier 40 stored in the onboard communication device 20 ("NO" in S140), the communication controller 22 may transmit a management file transmission request to the management server 3 (S150). The management file transmission request may be directed to requesting of transmission of the management file 50. One reason why the management file transmission request is transmitted is that the management file 50 of the onboard communication device 20 is not renewed to the latest one in the case where the obtained version identifier 40 of the control unit 10 does not agree with the version identifier 40 stored in the onboard communication device 20.

The process in step S140 in the case where the onboard communication device 20 obtains the plurality of version identifier 40 may be as follows. In the case where any one or more of the plurality of obtained version identifiers 40 do not agree with the version identifier 40 of the onboard communication device 20, the communication controller 22 may determine that the obtained version identifier 40 of the control unit 10 does not agree with the version identifier 40 stored in the onboard communication device 20.

Upon receiving the management file transmission request, the management server 3 may read the management file 50 and transmit the read management file 50 to the onboard communication device 20 (S160). Thus, the onboard communication device 20 may obtain the latest management file 50 from the management server 3.

Upon receiving the management file 50, the communication controller 22 of the onboard communication device 20 may overwrite the management file 50 of the onboard communication device 20 with the received management file 50 to update the management file 50 of the onboard communication device 20 (S170).

The update of the management file 50 of the onboard communication device 20 may make the version identifier 40 in the onboard communication device 20 and the memory address information 60 in the onboard communication device 20 be the latest ones. That is, the update of the management file 50 may make the relationship between the memory address of the volatile memory 14 and the transmission target data 18 and the relationship between the memory address indicated by the memory address information 60 of the onboard communication device 20 and the transmission target data 18 agree with each other.

Steps S150, S160, and S170 may be a management file updating process directed to updating the management file 50 of the onboard communication device 20.

After the management file 50 of the onboard communication device 20 is updated, the version identifier 40 of the control unit 10 and the version identifier 40 of the onboard communication device 20 may agree with each other continuously until the program 16 of the control unit 10 is updated next time. The relationship of the transmission target data 18 relative to the memory address of the non-volatile memory 12 and the relationship of the transmission target data 18 relative to the memory address indicated by the memory address information 60 of the onboard communication device 20 may also agree with each other continuously until the program 16 of the control unit 10 is updated next time.

After the management file 50 is updated (S170) or in the case where the obtained version identifier 40 agrees with the version identifier 40 stored in the onboard communication device 20 ("YES" in S140), the communication controller 22 may refer to the memory address information 60 in the management file 50 of the onboard communication device 20 and store information indicating the memory address at which the transmission target data 18 is stored, in a frame of the data transmission request directed to requesting of transmission of the transmission target data 18. The communication controller 22 may thereafter transmit the data transmission request in which the information indicating the memory address is stored, to the control unit 10 in which the transmission target data 18 is stored (S180).

Upon receiving the data transmission request, the control unit 10 may read data 18 from the memory address corresponding to the information indicating the memory address contained in the data transmission request. The control unit 10 may thereafter transmit the read data 18 to the onboard communication device 20 (S190). Thus, the onboard communication device 20 may designate the memory address to obtain the transmission target data 18 from the control unit 10.

Upon receiving the transmission target data 18, the communication controller 22 of the onboard communication device 20 may construct transmission data to be transmitted to the management server 3 (S200). For example, the communication controller 22 may store the received transmission target data 18 in a frame of the transmission data. In a case where there is a plurality of pieces of the transmission target data 18, the communication controller 22 may collectively store the plurality of pieces of the transmission target data 18 in the frame of the transmission data.

Thereafter, the communication controller 22 may transmit the transmission data to the management server 3 (S210) and finish the series of the processes. Thus, the transmission target data 18 may be transmitted from the control unit 10 to the management server 3. Steps S180, S190, and S200 may be a data transmitting process directed to transmitting of the transmission target data 18 to the management server 3. The management server 3 may transmit a reception completion signal to the onboard communication device 20, and the communication controller 22 of the onboard communication device 20 may finish the series of the processes after receiving the reception completion signal. The reception completion signal may indicate completion of reception of the transmission data.

As described above, the vehicle 2 of one example embodiment of the technology may compare the version identifier 40 in the control unit 10 with the version identifier 40 in the onboard communication device 20 to determine whether the version identifier 40 in the control unit 10 and the version identifier 40 in the onboard communication device 20 agree with each other. The vehicle 2 of one example embodiment of the technology may update the management file 50 of the onboard communication device 20 to the latest one in the case where the version identifier 40 in the control unit 10 does not agree with the version identifier 40 in the onboard communication device 20.

Thereby, the memory address information 60 in the onboard communication device 20 may be updated to the latest one. Updating the memory address information 60 in the onboard communication device 20 to the latest one may make the relationship between the memory address of the volatile memory 14 and the transmission target data 18 and the relationship between the memory address indicated by the memory address information 60 of the onboard communication device 20 and the transmission target data 18 agree with each other.

This enables the onboard communication device 20 to avoid designation of a memory address different from the memory address that should be designated in the vehicle 2 of one example embodiment of the technology. As a result, reading mistakenly-selected data 18, which is data different from the data 18 that should be read, is avoided in the vehicle 2 of one example embodiment of the technology.

Accordingly, the vehicle 2 of one example embodiment of the technology enables avoiding transmission of mistakenly-selected data 18 in transmitting data 18 from the control unit 10 provided in the vehicle 2 to the management server 3 provided outside the vehicle 2. In other words, the vehicle 2 of one example embodiment of the technology enables reliable transmission of the transmission target data 18 from the control unit 10 provided in the vehicle 2 to the management server 3 provided outside the vehicle 2. As a result, whether each device of the vehicle 2 operates properly, or any other condition, is checked outside the vehicle 2 by using the data communication system 1 of one example embodiment of the technology.

The vehicle 2 of one example embodiment of the technology may use the existing communication system between the onboard communication device 20 and the management server 3 to update the memory address information 60 of the onboard communication device 20. This eliminates the need to add a new component directed to updating of the memory address information 60 in the vehicle 2 of one example embodiment of the technology.

The vehicle 2 of one example embodiment of the technology is configured to allow updating of the management file 50 of the onboard communication device 20 only in the case where the version identifier 40 in the control unit 10 does not agree with the version identifier 40 in the onboard communication device 20. Therefore, the vehicle 2 of one example embodiment of the technology enables decreasing a frequency of communication between the onboard communication device 20 and the management server 3 compared with a comparative example in which the management file 50 is updated each time the transmission target data 18 is transmitted. This results in suppressing of cost of communication between the onboard communication device 20 and the management server 3 in the vehicle 2 of one example embodiment of the technology.

In one example, the memory address information 60 in the onboard communication device 20 can be updated separately from the update of the program 16 of the control unit 10. In this example, the update of the memory address information 60 in the onboard communication device 20 may accompany the update of the program 16 of the control unit 10.

In contrast, in the vehicle 2 of one example embodiment of the technology, the memory address information 60 or the management file 50 of the onboard communication device 20 may be automatically updated at the time of transmitting the transmission target data 18. Thereby, a separated update of the memory address information 60 of the onboard communication device 20 may not be necessary at the time of updating the program 16 of the control unit 10, and the transmission target data 18 is transmitted more reliably.

In a comparative example of transmitting the transmission target data 18 from the control unit 10 provided in the vehicle 2 to the management server 3 provided outside the vehicle 2, the transmission request of the transmission target data 18 can be transmitted from the management server 3 to the onboard communication device 20. However, in this comparative example, the onboard communication device 20 is not in operation in the case where the ignition switch of the vehicle 2 is not turned on. Therefore, it is difficult to receive the transmission request from the management server 3 and to transmit the transmission target data 18 to the management server 3.

In contrast, in the vehicle 2 of one example embodiment of the technology, the series of the processes relating to transmission of the transmission target data 18 may be executed mainly by the onboard communication device 20 in accordance with the schedule information 70 in the onboard communication device 20. This enables reliable transmission of the transmission target data 18 to the management server 3 in the vehicle 2 of one example embodiment of the technology, compared with the comparative example in which the management server 3 mainly manages transmission of the transmission target data 18.

Although preferred example embodiments of the technology have been described with reference to the attached drawings in the foregoing, the technology is by no means limited to the example embodiments described above and is variously modifiable. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the version identifier 40 may be set to each of the nonvolatile memories 12 in the forgoing example embodiment. However, the version identifier 40 may be provided to each of the programs 16 of the respective control units 10.

The foregoing example embodiment may use the three control units 10. However, the number of the control units 10 provided to the vehicle 2 is not limited to three. For example, two or less control units 10 may be provided to the vehicle or four or more control units 10 may be provided to the vehicle. That is, it may be sufficient that one or a plurality of control units 10 is provided to the vehicle 2.

The forgoing example embodiment uses one nonvolatile memory 12 for one control unit 10. However, one nonvolatile memory 12 may be provided and be shared by the plurality of control units 10 or a plurality of nonvolatile memories 12 may be provided for one control unit 10.

In the forgoing example embodiment, the version identifier 40 and the memory address information 60 may be included in the management file 50. However, the version identifier 40 and the memory address information 60 may not be included in the management file 50. That is, it may be sufficient that the onboard communication device 20 holds the version identifier 40 that has been updated at predetermined timing, in addition to the memory address information 60. In another example, the onboard communication device 20 may hold the memory address information 60 and the version identifier 40 that are associated with the control unit 10.

In the foregoing example embodiment, the management file 50 of the onboard communication device 20 may be updated. However, it may be sufficient that the memory address information 60 and the version identifier 40 of the onboard communication device 20 are updated. Therefore, one embodiment of the technology is not limited to the example embodiment in which the management file 50 is updated. That is, the onboard communication device 20 may be able to obtain, from the management server 3, the memory address information 60 that has been updated at the same time as the update of the version identifier 40 stored in the nonvolatile memory 12 or the volatile memory 14 of the control unit 10, to thereby update the memory address information 60. The onboard communication device 20 may hold the memory address information 60 thus updated, in addition to the version identifier 40 stored in the nonvolatile memory 12 or the volatile memory 14 of the control unit 10.

In another example, the onboard communication device 20 may hold the updated memory address information 60 in association with the control unit 10.

According the technology, an onboard communication device obtains a version identifier stored in a memory from a control unit at predetermined timing, and updates the information relating to the memory address by performing communication between a management server and the onboard communication device in the case where the version identifier stored in the memory does not agree with the version identifier held by the onboard communication device. Thus, it is possible to avoid transmitting mistakenly-selected data from the control unit provided in a vehicle to the management server provided outside the vehicle.

The onboard communication device 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the onboard communication device 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the onboard communication device 20 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle comprising:
   a control unit including a memory and configured to store
      a program and a first version identifier in the memory,
      the program being updated at any program update
      timing, the first version identifier being directed to
      identifying of a version of the updated program; and
   an onboard communication device configured to hold
      information including memory addresses of the
      memory to read data from and hold a second version
      identifier that is updated at predetermined timing independent of the program update timing, the onboard
      communication device being configured to be communicable with the control unit and with a management
      server provided outside the vehicle,
   the onboard communication device being configured to
      obtain, at the predetermined timing, the first version
      identifier stored in the memory from the control unit
      and to update the information including the memory
      addresses by communicating with the management
      server when the first version identifier stored in the memory does not agree with the second version identifier held by the onboard communication device.

2. The vehicle according to claim 1, wherein, after updating the information of the memory addresses, the onboard communication device designates one or more of the memory addresses on a basis of the updated information of the memory addresses, to read data from the memory and transmit the read data to the management server.

3. The vehicle according to claim 2, wherein the information of the memory addresses includes a relationship between the memory addresses and transmission target data, the transmission target data being data to be transmitted from the memory to the management server at the predetermined timing.

4. The vehicle according to claim 3, wherein the predetermined timing comprises start timing of a process of transmitting of the transmission target data to the management server.

5. The vehicle according to claim 4, wherein the onboard communication device holds information of the predetermined timing as schedule information.

6. The vehicle according to claim 1, wherein the control unit stores the first version identifier in any one, of the memory addresses, that is fixed regardless of the update of the program.

7. The vehicle according to claim 2, wherein the control unit stores the first version identifier in any one, of the memory addresses, that is fixed regardless of the update of the program.

8. The vehicle according to claim 3, wherein the control unit stores the first version identifier in any one, of the memory addresses, that is fixed regardless of the update of the program.

9. The vehicle according to claim 4, wherein the control unit stores the first version identifier in any one, of the memory addresses, that is fixed regardless of the update of the program.

10. The vehicle according to claim 1, wherein the onboard communication device designates, when the first version identifier stored in the memory agrees with the second version identifier held by the onboard communication device, one or more of the memory addresses on a basis of the information including the memory addresses held by the onboard communication device, to read data from the memory and transmit the read data to the management server.

11. The vehicle according to claim 2, wherein the onboard communication device designates, when the first version identifier stored in the memory agrees with the second version identifier held by the onboard communication device, one or more of the memory addresses on a basis of the information including the memory addresses held by the onboard communication device, to read data from the memory and transmit the read data to the management server.

12. The vehicle according to claim 3, wherein the onboard communication device designates, when the first version identifier stored in the memory agrees with the second version identifier held by the onboard communication device, one or more of the memory addresses on a basis of the information including the memory addresses held by the onboard communication device, to read data from the memory and transmit the read data to the management server.

13. The vehicle according to claim 4, wherein the onboard communication device designates, when the first version identifier stored in the memory agrees with the second version identifier held by the onboard communication device, one or more of the memory addresses on a basis of the information including the memory addresses held by the onboard communication device, to read data from the memory and transmit the read data to the management server.

14. The vehicle according to claim 1, wherein the control unit executes the program stored in the memory to control each device of the vehicle.

15. The vehicle according to claim 2, wherein the control unit executes the program stored in the memory to control each device of the vehicle.

16. The vehicle according to claim 3, wherein the control unit executes the program stored in the memory to control each device of the vehicle.

17. The vehicle according to claim 4, wherein the control unit executes the program stored in the memory to control each device of the vehicle.

18. The vehicle according to claim 1, wherein the onboard communication device obtains a version identifier stored in the memory from a control unit at the predetermined timing, and updates the information including the memory address by performing communication between the management server and the onboard communication device in response to a determination of a version identifier stored in the memory not agreeing with a version identifier held by the onboard communication device.

19. The vehicle according to claim 1, wherein the onboard communication device obtains a version identifier stored in the memory from a control unit at a time of transmitting transmission target data from the control unit to the management server to determine whether to update a relationship between the memory address held by the onboard communication device and a transmission target data.

20. A vehicle comprising:
a control unit including a memory and configured to store a program and a first version identifier in the memory, the program being updated at any program update timing, the first version identifier being directed to identifying of a version of the updated program; and
circuitry configured to
hold information including memory addresses of the memory to read data from and hold a second version identifier that is updated at predetermined timing independent of the program update timing,
be communicable with the control unit and with a management server provided outside the vehicle, and
obtain, at the predetermined timing, the first version identifier stored in the memory from the control unit and update the information including the memory addresses by communicating with the management server when the first version identifier stored in the memory does not agree with the second version identifier held by the circuitry.

* * * * *